United States Patent
Kobori et al.

[19]

[11] Patent Number: 5,946,283
[45] Date of Patent: Aug. 31, 1999

[54] OPTICAL INFORMATION RECORDING MEDIUM AND OPTICAL INFORMATION REPRODUCING DEVICE

[75] Inventors: Hiromichi Kobori, Yokohama; Kazuo Watabe, Kawasaki, both of Japan

[73] Assignee: Kabushiki Kaisha Toshiba, Kawasaki, Japan

[21] Appl. No.: 08/826,389

[22] Filed: Apr. 9, 1997

[30] Foreign Application Priority Data

Apr. 10, 1996 [JP] Japan .................................... 8-088221

[51] Int. Cl.[6] ........................................................ G11B 7/00
[52] U.S. Cl. .................. 369/124; 369/44.41; 369/275.4
[58] Field of Search ............................. 369/275.1, 275.3, 369/275.4, 44.26, 44.41, 44.42, 124

[56] References Cited

U.S. PATENT DOCUMENTS

| | | | |
|---|---|---|---|
| 4,963,464 | 10/1990 | Setani | 369/109 |
| 5,168,490 | 12/1992 | Braat | 369/109 |
| 5,493,552 | 2/1996 | Kobori | 369/275.4 |
| 5,553,051 | 9/1996 | Sugiyama et al. | 369/276.4 |

OTHER PUBLICATIONS

K. Kayanuma et al., "High Track Density Magneto–Optical Recording Using A Crosstalk Canceler", SPIE, vol. 1316, 1990, pp. 35–39.

S. Wadaya et al., "New Equalization For Digital Recording and Application To High Capacity FDD", The Institute of Electronics, Information & Communication Engineers.

*Primary Examiner*—Thang V. Tran
*Attorney, Agent, or Firm*—Pillsbury Madison & Sutro LLP

[57] ABSTRACT

An optical information recording medium comprises tracks having information recorded thereon as a mark portion where information is readable by irradiation of a light beam and a non-mark portion, wherein a first track whose optical phase difference between the mark portion and the non-mark portion is about $\lambda$ (¼+k/2) and a second track whose optical phase difference between the mark portion and the non-mark portion is about $\lambda$ (⅛+m/4)(k and m are integers of 0 or more) are alternatively arranged when a wavelength of the optical beam is set to $\lambda$.

5 Claims, 5 Drawing Sheets

OPTICAL INFORMATION RECORDING MEDIUM AND OPTICAL INFORMATION REPRODUCING DEVICE

BACKGROUND OF THE INVENTION

The present invention relates to an optical information recording medium and an optical information reproducing device for optically reproducing information recorded on the optical information recording medium such as an optical disk.

In recent years, much research and development has been actively pursued in the area of recording and reproducing techniques with higher density. For example, a so-called land and groove recording system is proposed in which information is recorded to both a land section and a groove section of a recording medium surface to increase the capacity. One technique for reproducing information recorded onto the optical disk by the land and groove recording system, is disclosed in the article "High Track Density Magneto-Optical Recording Using a Crosstalk Canceler", by K. kayanuma et al., SPIE, Vol. 1316, pp 35–39, 1990.

The above technique will be explained with reference to FIGS. 1 and 2. Specifically, as shown in FIG. 1, three adjacent tracks on an optical disk are irradiated with three light beams 21, 22, and 23, which are shown by circles having slanting lines. In this case, three adjacent tracks are a land section track 11 of an inner peripheral side, a central groove section track 12, and a land section track 13 of an outer peripheral side.

Then, as shown in FIG. 2, reproducing signals 31, 32, and 33 due to three light beams 21, 22, and 23 are input to a timing control section 51 to perform a phase adjustment. Then, reproducing signals 34, 35, and 36 due to light beams 21 and 23 of both sides among phase-adjusted reproducing signals 34, 35, and 36 are gain-controlled by a variable gain control section 52 to obtain signals 37 and 39. Thereafter, the gain-controlled signals 37 and 39 are added to produce signal 40, which is subtracted from a reproducing signal due to the central light beam 22 by a subtraction processing section 53. Thereby, there can be finally obtained a reproducing signal 41 in which crosstalk due to a recording mark 10 shown by a white circle of FIG. 1 is reduced. In this case, the gain of the variable gain control section 52 is set to maximize quality of the reproducing signal 41.

According to the above-explained prior art, the crosstalk from both adjacent tracks is subtracted from the reproducing signal due to the central light beam by an electrical processing in the land and groove recording system. As a result, the recording capacity can be increased as twice that of the traditional optical disk in which the recording mark is formed in only the groove section or the land section.

Thus, according to the above-explained prior art, the electrical processing including the complicated phase adjustment against the reproducing signal and the complicated gain adjustment are needed to reduce the crosstalk. As a result, the adjustment error in the phase and the gain occurs in accordance with increase in the recording density, that is, track density. Moreover, a crosstalk reduction effect is decreased by a difference of the adjustment caused by a change in the environment and imperfections inherent with the passage of time. In other words, the optical disk on which information is recorded with high density by the land and groove recording system is irradiated with three light beams to obtain the reproducing signal. The obtained reproducing signal is electrically processed to reduced the crosstalk, so that the recording density can be improved. As a result of the needed complicated adjustments, if the recording density is increased, there occurs a problem in that the crosstalk reduction effect is deteriorated by the adjustment error and the difference of adjustment.

Moreover, it is assumed that the above-mentioned prior art is used in a ZCAV (Zoned Constant Angular Velocity) recording system in which linear recording density is constantly maintained over the entire surface of the disk in order to obtain a large capacity. In this case, since a signal frequency differs every radial position of the disk, the phase adjustment due to the timing control section 51 becomes more complicated. As a result, the adjustment error and the adjustment difference in the phase and the gain more easily occur, and this brings about the deterioration of the crosstalk reduction effect.

To solve the above problem, as described in U.S. Pat. No. 5,168,490, there is disclosed a recording medium in which one of adjacent tracks has an area with a first phase depth (about $\pi$ radians or geometrical depth of about $\lambda/4$) and the other has an area with a second phase depth (about $2\lambda/3$ radians or geometrical depth of about $\lambda/8$). In this case, $\lambda$ is a wavelength of a reading beam.

In a reproducing information recorded on device for reproducing a recording medium in which the phase depth is changed to $d1=\pi$, $d2=2\pi/3$ every one track, as specifically explained later, signals are detected by two detectors. Then, a sum signal of detected signals obtained by two detectors is used as an information reproducing signal from the track of the first phase depth. Moreover, a differential signal of detected signals obtained by two detectors is used as an information reproducing signal from the track of the second phase depth.

However, in the track of the second phase depth for reproducing the differential signal, if the recording density is increased, the peak position of the differential signal corresponding to the pit edge position varies, and high density can not obtained.

BRIEF SUMMARY OF THE INVENTION

An object of the present invention is to provide an optical information recording medium and an optical information reproducing device, which can largely reduce the influence of crosstalk from adjacent tracks as compared with conventional means so that recording density can be greatly increased thus enlarging the recording capacity of the medium.

According to the present invention, there is provided an optical information recording medium comprising tracks having information recorded thereon as a mark portion where information is readable by irradiation of a light beam and a non-mark portion, wherein a first track whose optical phase difference between the mark portion and the non-mark portion is about $\lambda$ (¼+k/2) and a second track whose optical phase difference between the mark portion and the non-mark portion is about $\lambda$ (⅛+m/4)(k and m are integers of 0 or more) are alternatively arranged when a wavelength of the optical beam is set to $\lambda$.

Also, according to the present invention, there is provided an optical information recording medium comprising tracks having information recorded thereon as a mark portion where information is readable by irradiation of a light beam and a non-mark portion, wherein a first track whose optical phase difference between the mark portion and the non-mark portion is about $\lambda$ (¼+k/2) or less and a second track whose optical phase difference between the mark portion and the non-mark portion is about $\lambda$ (⅛+m/4) or less (k and m are integers of 0 or more) are alternatively arranged when a wavelength of the optical beam is set to $\lambda$.

Moreover, the optical information recording apparatus, which reproduces information from the above described optical information recording medium, comprises: a section for irradiating the optical information recording medium with a light beam; photodetecting means for detecting reflected light from the optical information recording medium; and calculating means for generating an information reproducing signal from an output signal of the photodetecting means, wherein the photodetecting means has at least two light receiving surfaces arranged to be separated from each other in a projected image of the track, and the calculating means generates a sum signal of two output signals corresponding to two light-receiving surfaces in the first track to be used as the information reproducing signal, and generates a composite signal of a derivative signal of a differential signal between two output signals corresponding to two light-receiving surfaces, and a signal obtained by multiplying an integral signal by a constant in the second track to be used as the information reproducing signal.

Furthermore, according to the present invention, there is provided an optical information recording medium comprising tracks having information recorded thereon as a mark portion where information is readable by irradiation of a light beam and a non-mark portion, wherein a first track whose optical phase difference between the mark portion and the non-mark portion is about $\lambda$ (¼+k/2) and a second track whose optical phase difference between the mark portion and the non-ark portion is about $\lambda$ (⅛+m/4)(k and m are integers of 0 or more) are alternatively arranged when a wavelength of the optical beam is set to $\lambda$.

Also, optical information recording apparatus, which reproduces information from the above described optical information recording medium comprises: a section for irradiating the optical information recording medium with a light beam; photodetecting a section for detecting reflected light from the optical information recording medium; and a calculating section for generating an information reproducing signal from an output signal of the photodetecting section, wherein the photodetecting section has at least two light receiving surfaces arranged to be separated from each other in a projected image of the track, and the calculating section generates a sum signal of two output signals corresponding to two light-receiving surfaces in the first track to be used as the information reproducing signal, and generates a differential signal between two output signals corresponding to two light-receiving surfaces in the second track to be used as the information reproducing signal.

Thus, the pre-pit depth (phase depth) of the recording medium or the phase difference between the mark portion and the non-mark portion is set to the predetermined value, and the crosstalk included in the information reproducing signal from the adjacent tracks can be largely and effectively reduced. As a result, the track pitch can be made much narrower than the conventional case, the capacity of the recording medium can be improved.

The sum signal of two output signals corresponding to two light-receiving surfaces from the photodetector having at least two light-receiving surfaces arranged to be divided in the direction of the projected image of the track is obtained. Also, the composite signal of the derivative signal of the differential signal between two output signals and the integral signal is obtained. The sum signal and the composite signal are changed for each of adjacent tracks so as to generate the information reproducing signal. Thereby, the crosstalk can be suppressed from the adjacent tracks. Unlike the conventional case, it is unnecessary to provide the complicated adjustment of the phase against the reproducing signal and the complicated adjustment of the gain. As a result, problems in the error of phase and gain adjustment, and the problems associated with the difference of the adjustment caused by a change in an environment and a change due to the passage of time can be solved.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

The following will explain an embodiment of the present invention with reference to the accompanying drawings.

Figure 1:
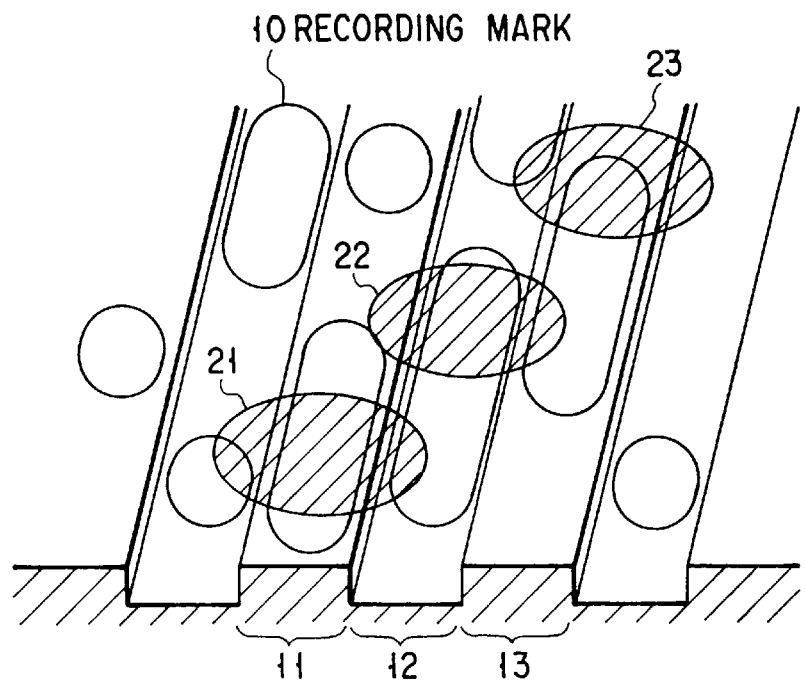
FIG. 1 is a view showing a conventional reproducing method of three-beam system in an optical disk in which information is recorded by a land and groove recording system.
Figure 2:
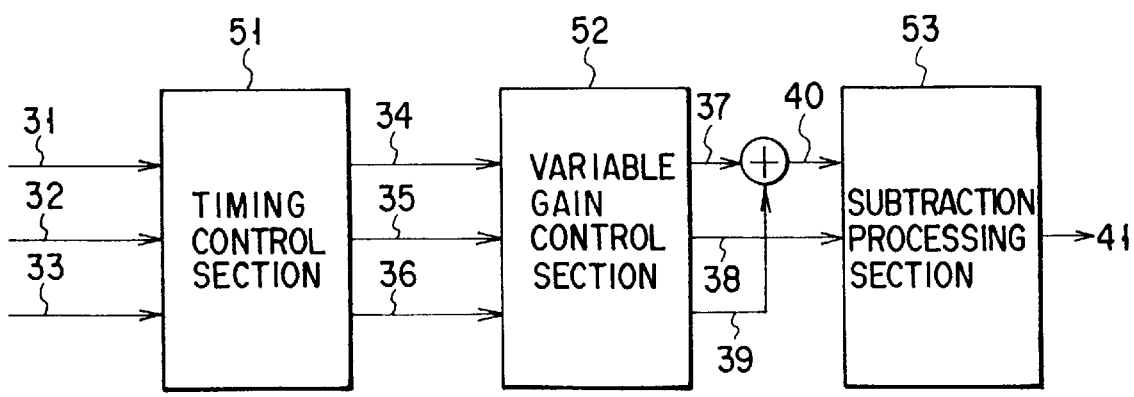
FIG. 2 is a block diagram showing a conventional crosstalk removing circuit in an optical disk in which information is recorded by a land and groove recording system.
Figure 3:
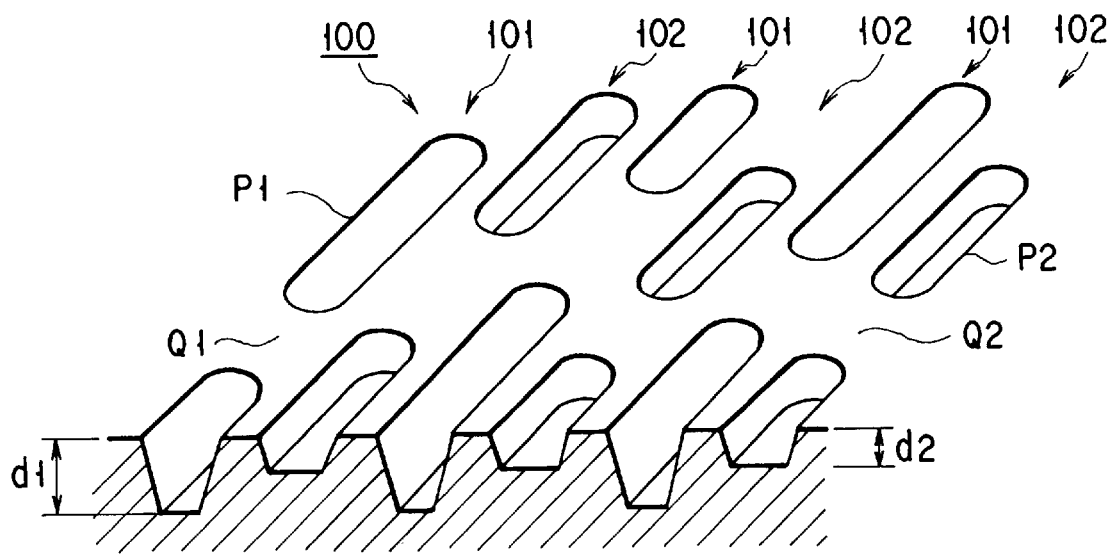
FIG. 3 is a view showing a structure of an optical disk according to one embodiment of the present invention.

FIG. 3 is a view showing the structure of a read-only optical disk, serving as an optical information recording medium according to an embodiment of the present invention.

An optical disk 100 of FIG. 3 has tracks 101 and 102 having a predetermined shape such as a spiral or concentric shape. The tracks 101 and 102 are formed on a transparent disk substrate having a reflection film made of e.g., an aluminum film. Each track has a mark in a form of a pre-pit. Then, information is recorded by a pre-pit portion, which is a mark portion, and a non-pre-pit portion which is a non-mark portion. By the optical disk 100, an optical phase difference between the pre-pit portion and the non-pre-pit portion is different for each of the adjacent tracks.

In this case, in the first tracks 101, which are odd number tracks, it is assumed that a depth d1 of a pre-pit portion P1 is set to the following equation such that an optical phase difference between the pre-pit portion P1 and a non-pre-pit portion Q1 becomes about $\lambda/4$ of an optical beam to be used in reproduction:

$$d1=(\lambda/n)/4 \text{ to } (\lambda/n)/2$$

wherein a refractive index of the disk substrate at wavelength $\lambda$ is n.

The depth d1 of the pre-pit in which the optical phase difference between the pre-pit portion P1 and the non-pre-pit portion Q1 becomes about $\lambda/4$ of the optical beam depends on a cross-sectional shape of the pre-pit. According as the shape of the pre-pit deviates from the rectangular shape and the inclination angle of a pre-pit side surface becomes smooth, the depth d1 increases.

On the other hand, in the second tracks 102, which are even number tracks, it is assumed that a depth d2 of a pre-pit portion P2 is set to the following equation such that an optical phase difference between the pre-pit portion P2 and a non-pre-pit portion Q2 becomes about ⅛ of a wavelength $\lambda$ of an optical beam to be used in reproduction:

$$d2=(\lambda/n)/8 \text{ to } (\lambda/n)/5.$$

For reproducing information recorded in the optical disk 100, the optical disk 100 is irradiated with a light beam. Then, its reflected light is detected by a 2-segment photodetector having two light receiving surfaces divided in a direction of a projected image of track. Then, a sum signal of two output signals corresponding to two light receiving surfaces of the photodetector, and a composite signal of a derivative signal of the differential signal between two output signals and an integral signal thereof are changed for each of the adjacent tracks to generate an information reproducing signal. As a result, there can be obtained the information reproducing signal in which a crosstalk from the adjacent tracks is effectively reduced.

Figure 4:
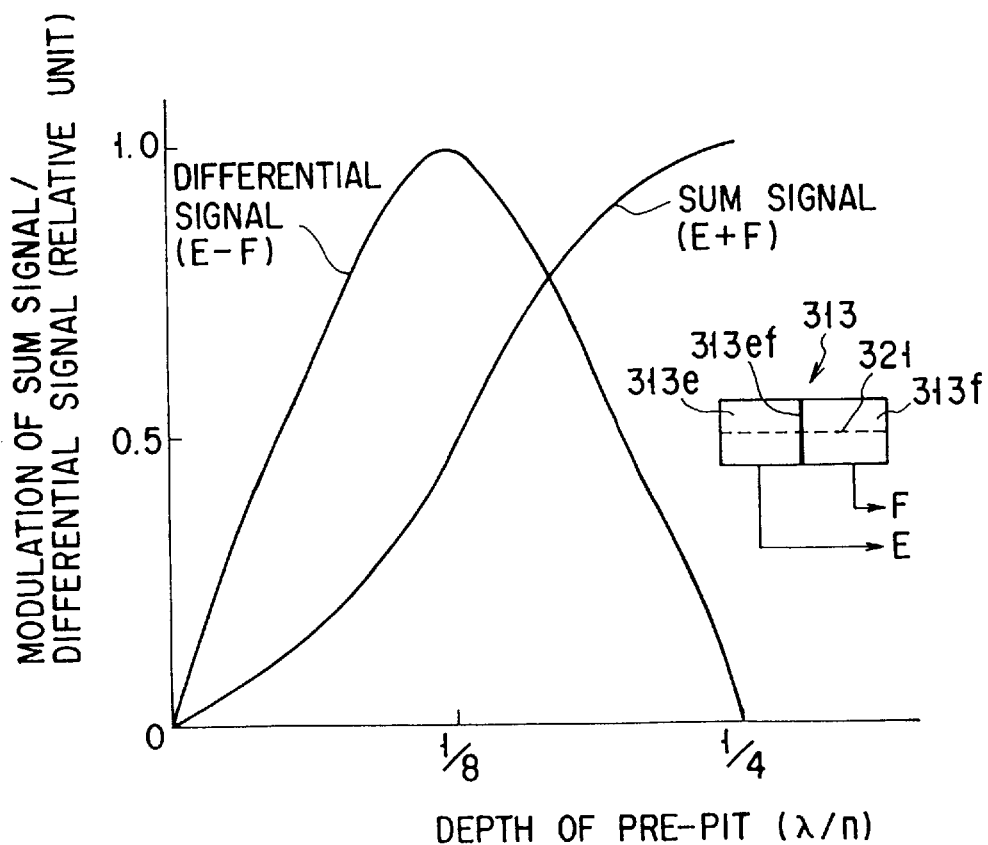
FIG. 4 is a view showing the relationship between a depth of a pre-pit and a modulation of a sum signal, and the relationship between the depth of the pre-pit and the modulation rate of a differential signal to explain the principle of a crosstalk reduction between the adjacent tracks according to one embodiment of the present invention.

The following will explain the reason why the crosstalk can be effectively reduced by the above-mentioned structure with reference to FIG. 4.

FIG. 4 is a view showing the relationship between the depth of the pre-pit whose cross-section is rectangular and a modulation of a sum signal (E+F) of outputs E and F, and the relationship between the depth of the pre-pit and the modulation rate of a differential signal (E−F) between outputs E and F. In this case, output signals E and F correspond to two light receiving surfaces 313e and 313f of a photo detector, which are divided in a direction of a projected image of track 321, respectively. As shown in FIG. 4, if the depth of the pre-pit is $(\lambda/n)/4$, the modulation of the sum signal (E+F) becomes maximum. If the depth of the re-pit is $(\lambda/n)/8$, the modulation of the difference signal (E−F) becomes maximum.

If attention is paid to the sum signal (E+F) of FIG. 4, the modulation of the information reproducing signal becomes maximum when the depths of the pre-pits of all tracks are $(\lambda/n)/4$. This also shows that the crosstalk from the adjacent tracks becomes maximum. Moreover, in the sum signal (E+F), as the pre-pit depth of the adjacent tracks deviates from $(\lambda/n)/4$, the crosstalk from the adjacent tracks becomes small. For example, it is assumed that the pre-pit depth of the adjacent tracks is $(\lambda/n)/8$. This means that the amount of the crosstalk is reduced to about ½ of the case of $(\lambda/n)/4$. Therefore, if the amount of the crosstalk is allowed up to the amount, which is equivalent to the case of $(\lambda/n)/4$, the track pitch can be made much narrower than the conventional case.

Figure 5A:
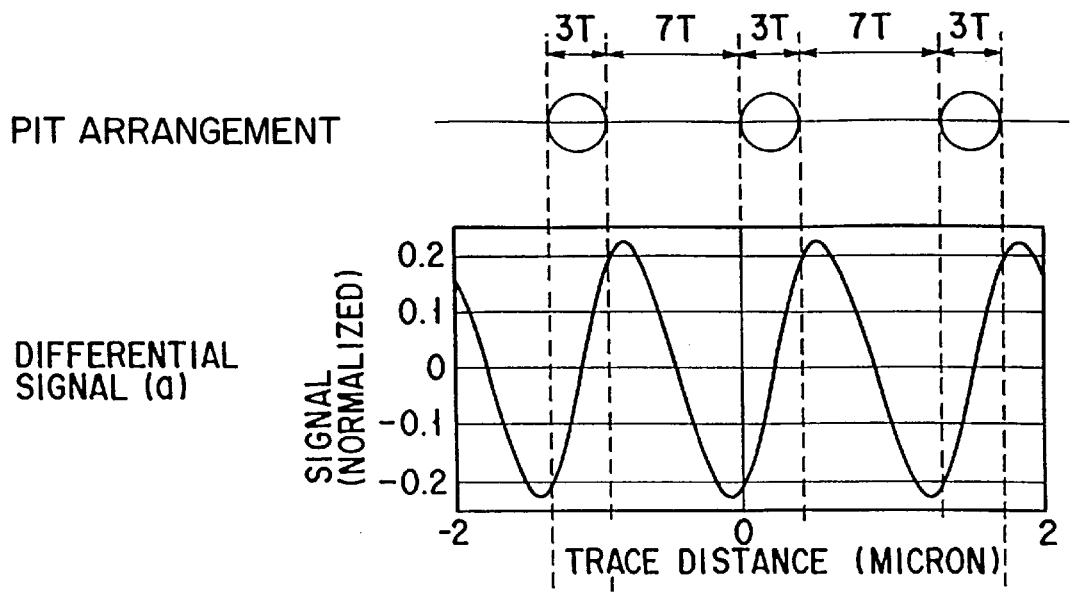
FIGS. 5A–5D are views showing a detection principle of an information reproducing signal of a track having a phase difference of about $\lambda/8$ according to one embodiment of the present invention.
Figure 5B:
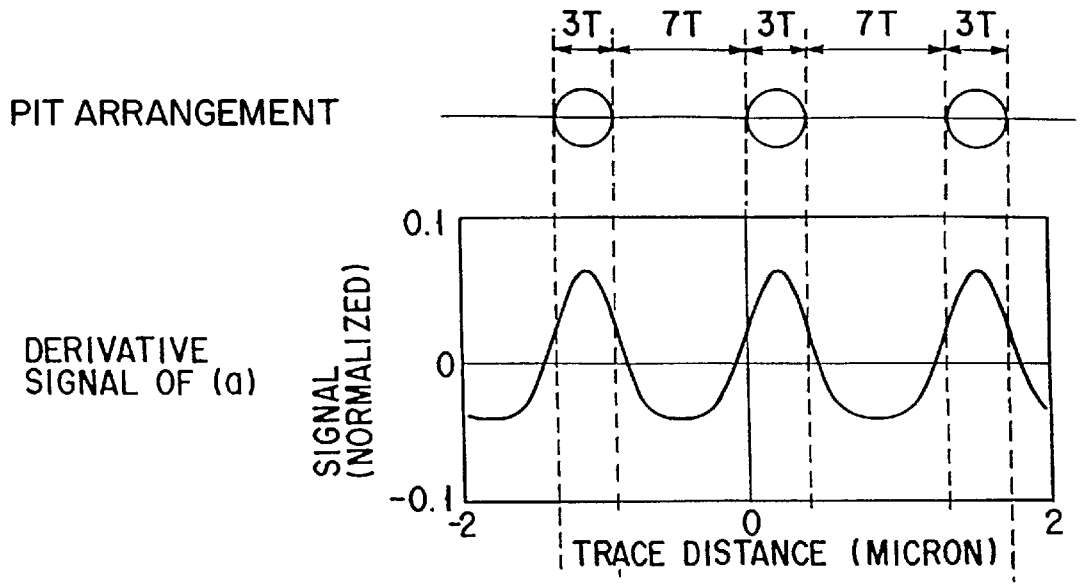
Figure 5C:
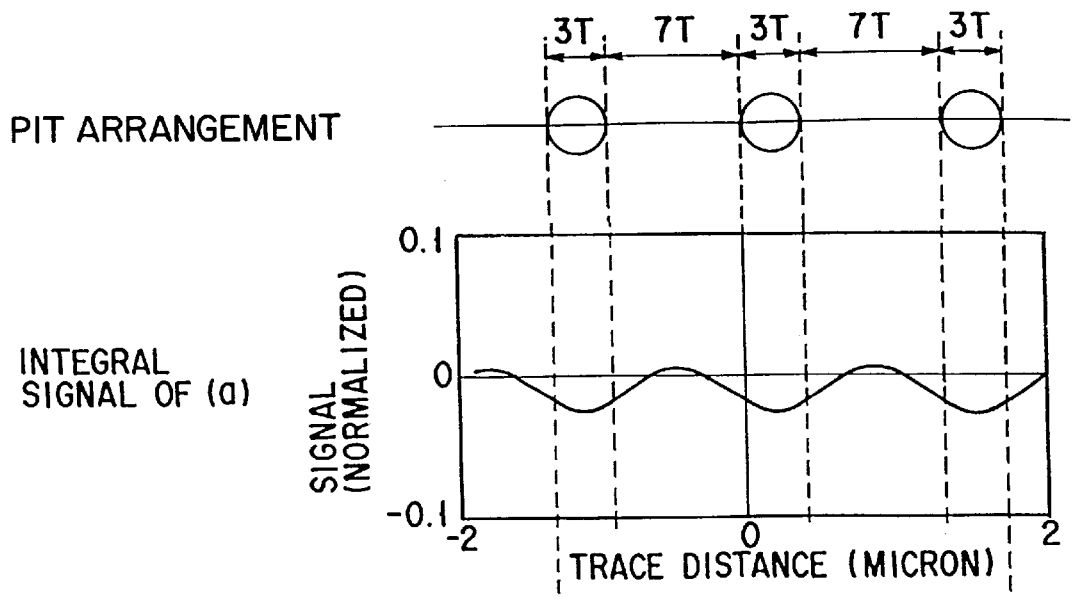
Figure 5D:
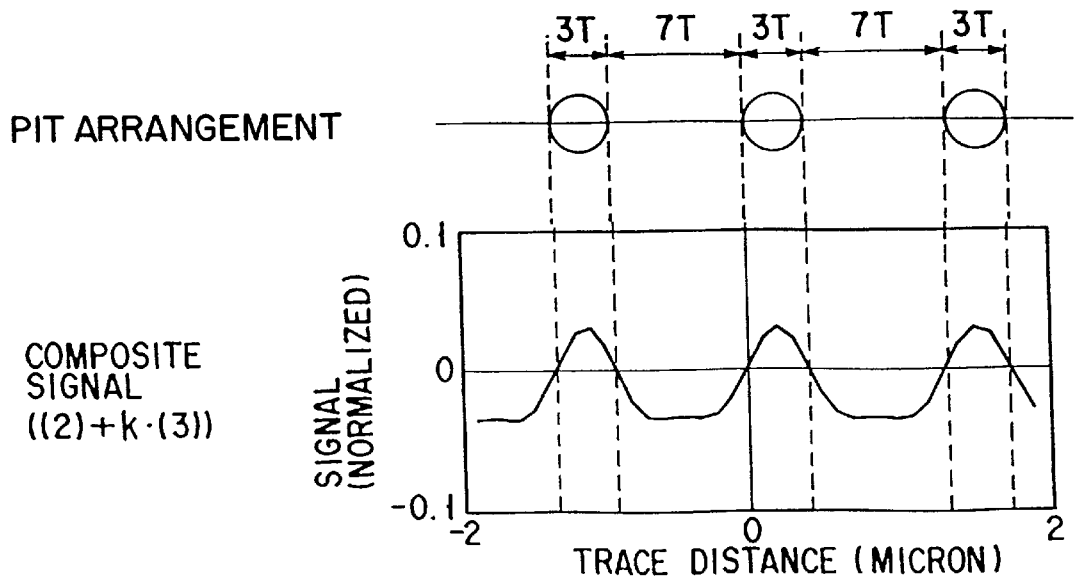

FIGS. 5A–5D show a detection principle of the information reproducing signal from the second track having a pre-pit depth of about $(\lambda/n)/8$. FIG. 5A shows a simulated waveform of a differential signal. FIG. 5B shows a simulated waveform for a derivative waveform of the differential signal. FIG. 5C shows a simulated waveform of an integral waveform of the differential signal and FIG. 5D shows a simulated waveform of a composite waveform. These simulation waveforms are obtained when a 3T pit having a length of 0.4 μm and a depth of 51 nm (=λ/8) and a 7T space having a length of 0.4×(7/3)μm are reproduced by an optical head having a laser-wavelength of 650 nm and an objective lens NA: 0.6 in a modulation code of 8/16. Since the length (0.4 μm) of 3T pit is shorter than a reproducing beam spot size (≈0.9 μm), a peak position of the differential signal is shifted from a 3T pit edge (broken line in the figure), and the pit edge position cannot be correctly detected.

On the other hand, a zero level cross position of the composite signal conforms to the 3T pit edge position (broken line of the figure). In this case, the composite signal is obtained by adding the derivative signal of the differential signal and the integral signal at a certain rate K (=1.3).

This can be explained as follows:

Specifically, the derivative signal and the integral signal are changed to have an opposite polarity. Then, if these signals are composed at a certain rate k (=1.3), the variation of the edge position is corrected.

As an example in which the same signal calculation is executed to reduce the peak position and the signal calculation is used in the floppy disk reproducing signal, see the article "New Waveform Equivalent Method and Large Capacity FDD Application", by Wadatani et al., National Meeting of the Institute of Electronics, Information and Communication Engineers, pp 1–193, 1987. However, the embodiment of the present invention is used in the optical disk in which the optical phase difference is changed every track to reduce the crosstalk. Therefore, the present invention is fundamentally different from the example of use of the floppy disk as in Wadatani.

If attention is paid to the differential signal (E−F) of FIG. 4, the modulation of the crosstalk component becomes 0 when the pre-pit depth of the adjacent tracks is $(\lambda/n)/4$. In other words, no crosstalk appears in the differential signal (E−F).

The pre-pit depth $d1=(\lambda/n)/4$, the pre-pit depth $d2=(\lambda/n)/8$ are changed every one track. The sum signal (E+F) is used as an information reproducing signal from the track (first track) of the pre-pit depth $d1=(\lambda/n)/4$. Then, the composite signal, $$\frac{d}{dt}(E-F)+k\int(E-F)dt$$

(wherein k is a constant), is used as an information reproducing signal from the track (second track) of the pre-pit depth $d2=(\lambda/n)/8$. Thereby, the track pitch can be made much narrower than the conventional case to increase the recording density. Thereby, the optical disk having a large capacity can be obtained.

In this case, as shown in FIG. 4, the amount of crosstalk from the adjacent tracks becomes unbalanced by the information reproducing signal obtained as the sum signal (E+F)

from the first track of the pre-pit depth d1=(λ/n)/4 and the information reproducing signal obtained as the information reproducing signal obtained as the composite signal, $$\frac{d}{dt}(E-F) + k\int (E-F)dt$$

from the second track of the pre-pit depth d2=(λ/n)/8. To solve this problem, it is preferable that the pre-pit depths d1 and d2 of both tracks be set to balance the amount of crosstalk. According to the present invention, d1<(λ/n)/4 and d2<(λ/n)/8 are set to balance the amount of crosstalk from the adjacent tracks by the sum signal and the composite signal.

Even if the amount of crosstalk from the adjacent tracks becomes unbalanced, information in which high reliability and high recording quality are required is recorded onto the track (second track in this case) whose amount of crosstalk is small. Then, other information is recorded in the track whose amount of crosstalk is large. As a result, there is no problem in terms of the practical use even if unfavorable influence is caused by such an unbalance.

The above explained the case in which the cross-section of the pre-pit was rectangular. However, according as the shape of the pre-pit deviates from the rectangular shape and the inclination angle of a pre-pit side surface becomes smooth the pre-pit depths d1 and d2 may be larger than (λ/n)/4 and (λ/n)/8, respectively. In this case, the upper limit of the depth d1 is allowed to (λ/n)/2 and that of the depth d2 is allowed to (λ/n)/5.

In the above explanation, in the first track 101, the optical phase difference between the pre-pit portion P1 and the non-pre-pit portion Q1 was set to about λ/4. In the second track 102, the optical phase difference between the pre-pit portion P2 and the non-pre-bit portion Q2 was set to about λ/8. However, if the former case is set to about λ/4, 3 λ/4, 5 λ/4, . . . that is, about λ(¼+k/2) and the latter case is set to about λ/8, 3 λ/8, 5 λ/8, . . . that is, about λ(⅛+m/4), it is obvious that the same effect can be obtained. In this case, k is an integer of 0 or more, and m is an integer of 0 or more.

Figure 6:
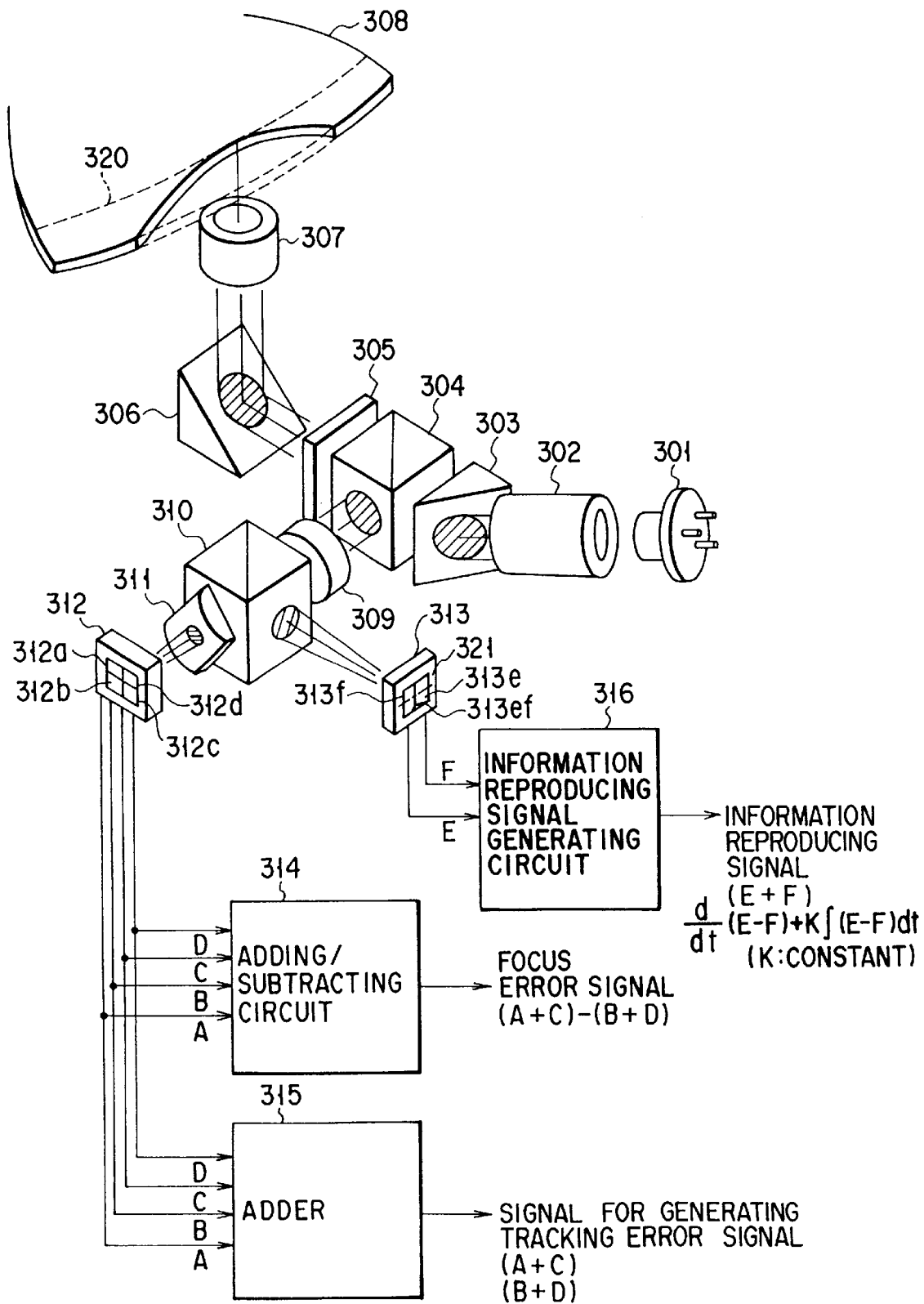
FIG. 6 is a view showing the structure of an optical information reproducing device according to one embodiment of the present invention.

Next, the following will explain the embodiment of an optical information reproducing device for reproducing information recorded onto the optical disk with reference to FIG. 6.

In FIG. 6, a light beam emitted from a semiconductor laser 301 as a light source becomes a parallel light by a collimating lens 302. Further, the light beam having anisotropic intensity distribution is converted to a light beam having isotropy intensity distribution by a beam shaping prism 303 to be made incident on a first beam splitter 304. The light beam transmitted through the first beam splitter 304 is transmitted through a quarter-wave plate 305. Thereafter, the light beam is reflected by a reflecting mirror 306 to be guided to an objective lens 307. Then, a recording surface of a read-only optical disk 308 is irradiated with the guided light beam as a minute light spot.

The collimating lens 302, the beam shaping prism 303, the first beam splitter 304, the quarter-wave plate 305, the reflecting mirror 306, and the objective lens 307 form a first optical system for guiding the optical beam to the read-only optical disk 308.

On the other hand, light reflected on the recording surface of the read-only optical disk 308 is incident on the first beam splitter 304 via the objective lens 307, the reflecting mirror 306, and the quarter-wave plate 305 in an opposite order to irradiation light. Then, the light beam is reflected by the first beam splitter 304. The reflected light beam is condensed by a condensing lens to be a focusing beam. The focusing beam is divided into two beams by a second beam splitter 310 as focusing.

One of two light beams divided by the second beam splitter 310 is transmitted to a cylindrical lens 311 to be incident on a 4-segment photodetector for focusing and track servo 312. In this case, the cylindrical lens 311 is inclined at 45° to the beam center of the light beam. The other light beam is directly incident on an information reproducing photodetector 313.

The first beam splitter 304, the condensing lens 309, the second beam splitter 310, and the cylindrical lens 311 form a second optical system for guiding the light beam reflected from the disk 308 to the photodetectors 312 and 313.

The 4-segment photodetector 312 is provided to perform focus servo and tracking servo. The photodetector 312 comprises four-divided light receiving surfaces 312a, 312b, 312c, and 312d. Output signals A, B, C, and D, which are output from the photodetector 312 as photo currents corresponding to the respective light receiving surfaces 312a, 312b, 312c and 312d, are calculated by an adding/subtracting circuit 314 and an adder 315.

In other words, the circuit 314 generates a focus error signal, which is necessary to perform focus servo so as to conform a focus position of the objective lens 307 to the recording surface of the optical disk 308. The adder 315 generates a tracking error signal, which is necessary to perform tracking servo to have the light beam with which the optical disk 308 is irradiated followed a predetermined track 320 on the optical disk 308. More specifically, the focus error signal is generated by the calculation of (A+C)−(B+D). The tracking error signal is generated by detecting two phase differences for detecting tracking error, which are generated by the calculation of (A+C)−(B+D).

On the other hand, the photodetector 313 is provided to reproduce information recorded on the optical disk 308. The photodetector 313 comprises two-divided light receiving surfaces 313e and 313f. In this case, a dividing line 313ef of the photodetector is arranged to have an angle of 90° to a projected image 321 of a track 320 on the optical disk 308. In other words, the light receiving surfaces 313e and 313f are divided in the direction of the projected image 321 of the track.

Output signals E and F, which are output from the photodetector 313 as photo currents corresponding to the respective light receiving surfaces 313e and 313f, are calculated by an information reproducing signal generating circuit 316 so as to generate an information reproducing signal. More specifically, the information reproducing signal is obtained as a sum signal of (E+F) or a composite signal, (wherein k is a constant). In other words, as explained in FIGS. 3 and 4, the sum signal (E+F) is extracted as an information reproducing signal from the track (first track) of pre-pit depth d=(μ/n)/4 on the optical disk 308. Moreover, the composite signal, (wherein k is a constant), is extracted as an information reproducing signal from the track (second track) of pre-pit depth d=(μ/n)/8.

Thus, there can be obtained the information reproducing signal in which the crosstalk component between the adjacent tracks on the read-only optical disk 308 is effectively removed in accordance with the above-mentioned principle.

In the explanation of the above embodiment, the read-only optical disk was explained. Specifically, the level difference having a concave and convex shape (the change of physical shape), which was called pre-pit, was formed. Then, the optical phase difference between the mark portion and the non-mark portion, which were generated by the level difference, were detected so as to perform the reproducing operation. However, as an optical information recording medium, various kinds of optical information recording mediums can be used by depending on the recording conditions such as recording power or recording pulse width. Specifically, there may be used a medium in which the physical shape change (formation of holes or that of bubbles) of the medium is caused between the mark portion and the non-mark portion. Or, there can be used a medium in which the optical phase difference between the mark portion and the non-mark portion is changed in accordance with the change of optical constants (change of refractive index and that of attenuation coefficient). For example, a write-once medium, a phase change medium, or an organic color medium, etc., may be used. Even in such optical information recording mediums, similar to the embodiment of the present invention, the optical phase difference between the mark portion and the non-mark portion is made different between the adjacent tracks. Then, by performing the reproducing in the same way as the above-mentioned embodiment, the crosstalk reduction effect can be obtained.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

We claim:

1. An optical information recording apparatus, which reproduces information from an optical information recording medium comprising a plurality of tracks having information recorded thereon as a mark portion where information is readable by irradiation of a light beam and a non-mark portion, the plurality of tracks having at least two optical phase differences, said optical information recording apparatus comprising:

a light source for irradiating said optical information recording medium with a light beam;

a photodetector for detecting reflected light from said optical information recording medium; and a calculator for generating an information reproducing signal from an output signal of said photodetector, wherein said photodetector has at least two light receiving surfaces arranged to be separated from each other in a direction of a projected image of said track, and said calculator generates a sum signal of two output signals corresponding to said two light-receiving surfaces in said first track to be used as said information reproducing signal, and generates a composite signal obtained by the following formula:

$$\frac{d}{dt}(E-F) + k\int (E-F)dt$$

where (E−F) is a differential signal between two output signals corresponding to said two light-receiving surfaces, and k is a constant.

2. The optical information recording apparatus of claim 1, wherein said plurality of tracks comprises at least a first track and a second track, and said first track having an optical phase difference between said mark portion and said non-mark portion of about $\lambda(\frac{1}{4}+k/2)$ and said second track having an optical phase difference between said mark portion and said non-mark portion of about $\lambda(\frac{1}{8}+m/4)$, where k and m are integers of 0 or more and $\lambda$ is a wavelength of the optical beam.

3. The optical information recording apparatus of claim 1, wherein said plurality of tracks comprises at least a first track and a second track, and said first track having an optical phase difference between said mark portion and said non-mark portion of about $\lambda(\frac{1}{4}+k/2)$ or less and said second track having an optical phase difference between said mark portion and said non-mark portion of about $\lambda(\frac{1}{8}+m/4)$ or less, where k and m are integers of 0 or more and $\lambda$ is a wavelength of the optical beam.

4. The optical information recording apparatus of claim 1, wherein said plurality of tracks comprises at least a first track and a second track, and when an angle of an inclined plane of a section in said mark portion is not perpendicular to an angle of a surface of said optical information recording medium, said first track having an optical phase difference between said mark portion and said non-mark portion of about from $\lambda(\frac{1}{4}+k/2)$ to $\lambda(\frac{1}{2}+k/2)$ and said second track having an optical phase difference between said mark portion and said non-mark portion of about from $\lambda(\frac{1}{8}$ to $m/5)$ to $\lambda(\frac{1}{5}+m/4)$, where k and m are integers of zero or more and $\lambda$ is a wavelength of said optical beam.

5. An optical information recording medium comprising tracks having information recorded thereon as a mark portion where information is readable by irradiation of a light beam and a non-mark portion, wherein said tracks comprise at least a first track and a second track alternatively arranged on a recording medium, and said first track having an optical phase difference between said mark portion and non-mark portion in a range from about $\lambda(\frac{1}{4}+k/2)$ to $\lambda(\frac{1}{2}$ to $k/2)$ and said second track having an optical phase difference between said mark portion and said non-mark portion in a range from about $\lambda(\frac{1}{8}+m/4)$ to $\lambda(\frac{1}{5}+m/4)$ where both said first track and said second track both depend on a shape of said mark portion and an inclination angle of a surface of said mark portion, where k and m are integers equal to or greater than 0, and $\lambda$ is a wavelength of the optical beam.

* * * * *